Figure 1:
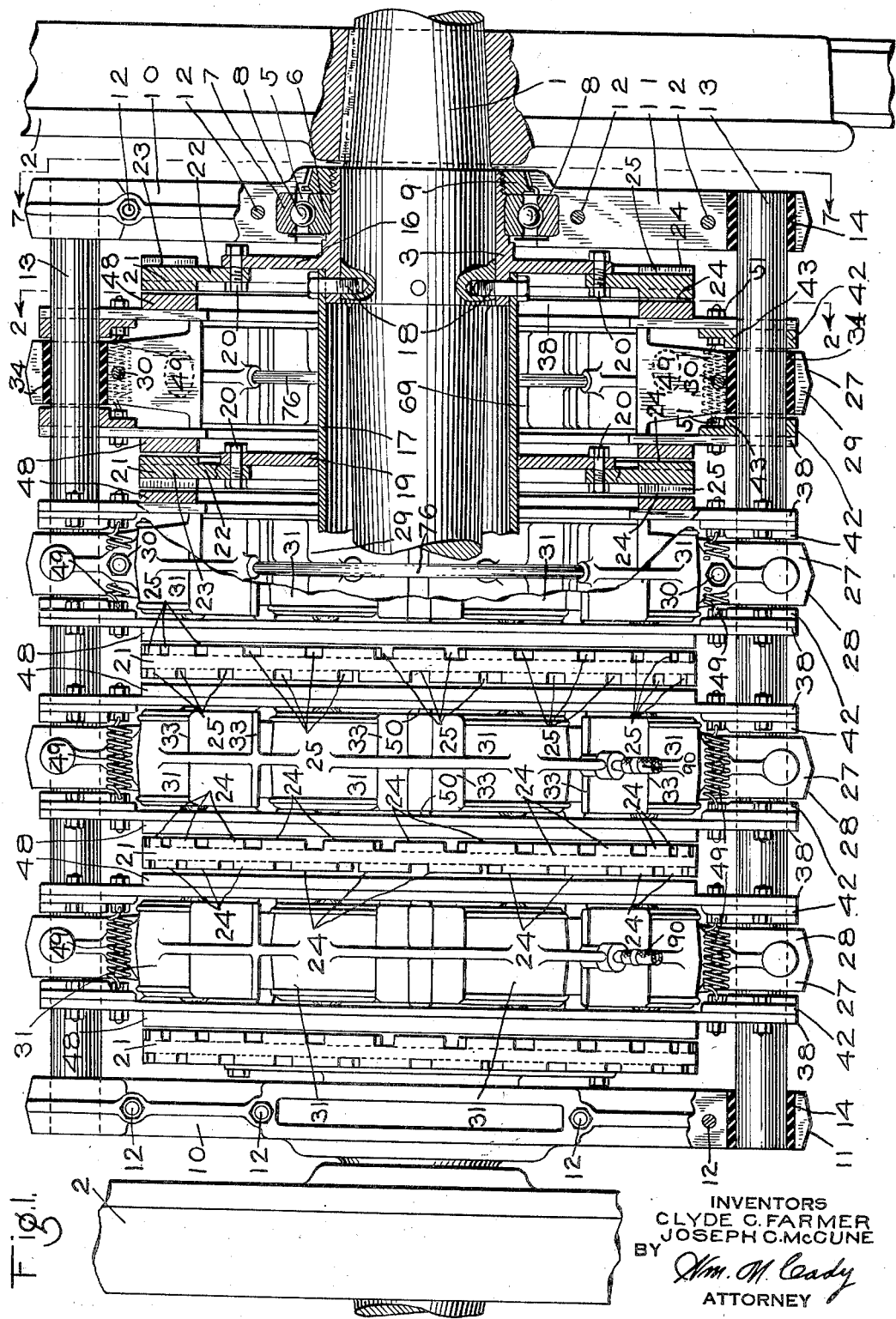

Sept. 26, 1939.  C. C. FARMER ET AL  2,174,397
BRAKE MECHANISM
Filed Oct. 21, 1937  3 Sheets-Sheet 1

INVENTORS
CLYDE C. FARMER
JOSEPH C. McCUNE
BY Wm. M. Cady
ATTORNEY

Sept. 26, 1939.   C. C. FARMER ET AL   2,174,397
BRAKE MECHANISM
Filed Oct. 21, 1937    3 Sheets-Sheet 2
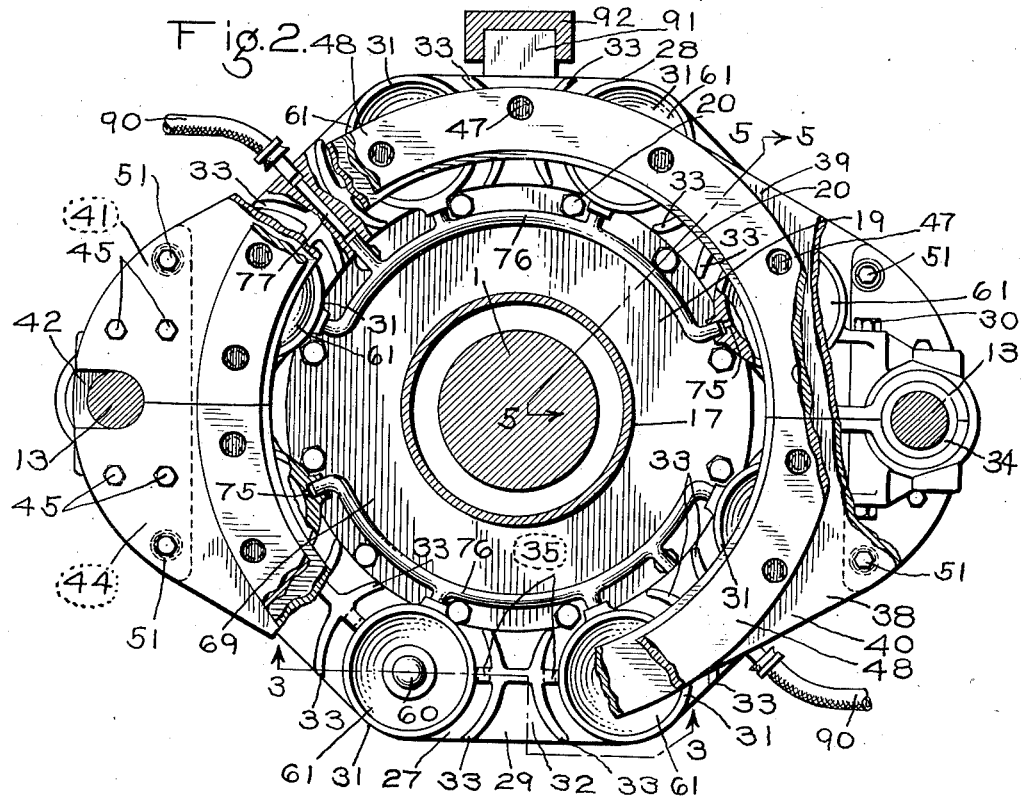
Fig. 2.
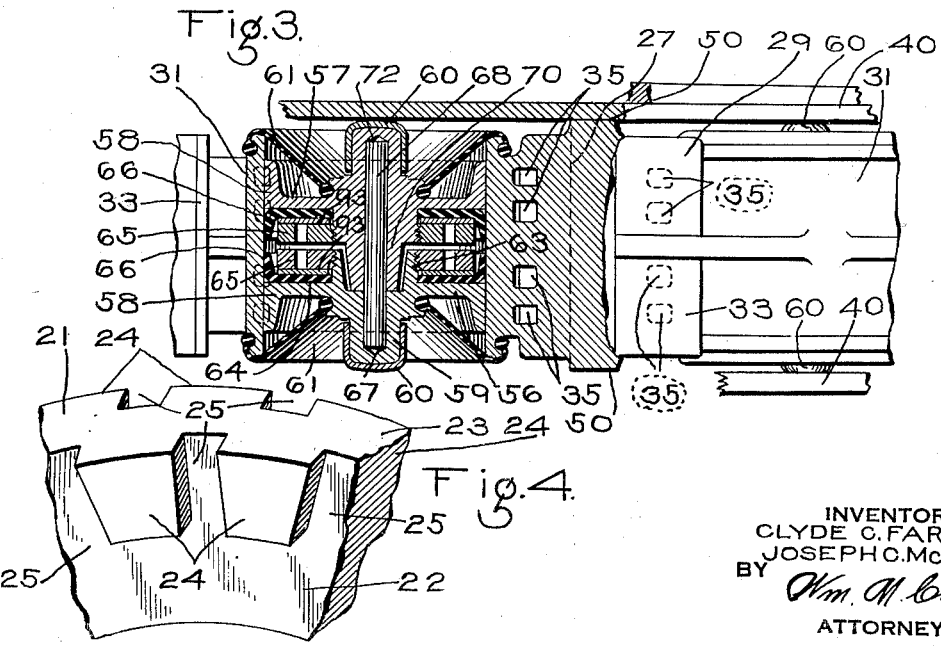
Fig. 3.
Fig. 4.
INVENTORS
CLYDE C. FARMER
JOSEPH C. McCUNE
BY Wm. M. Cady
ATTORNEY

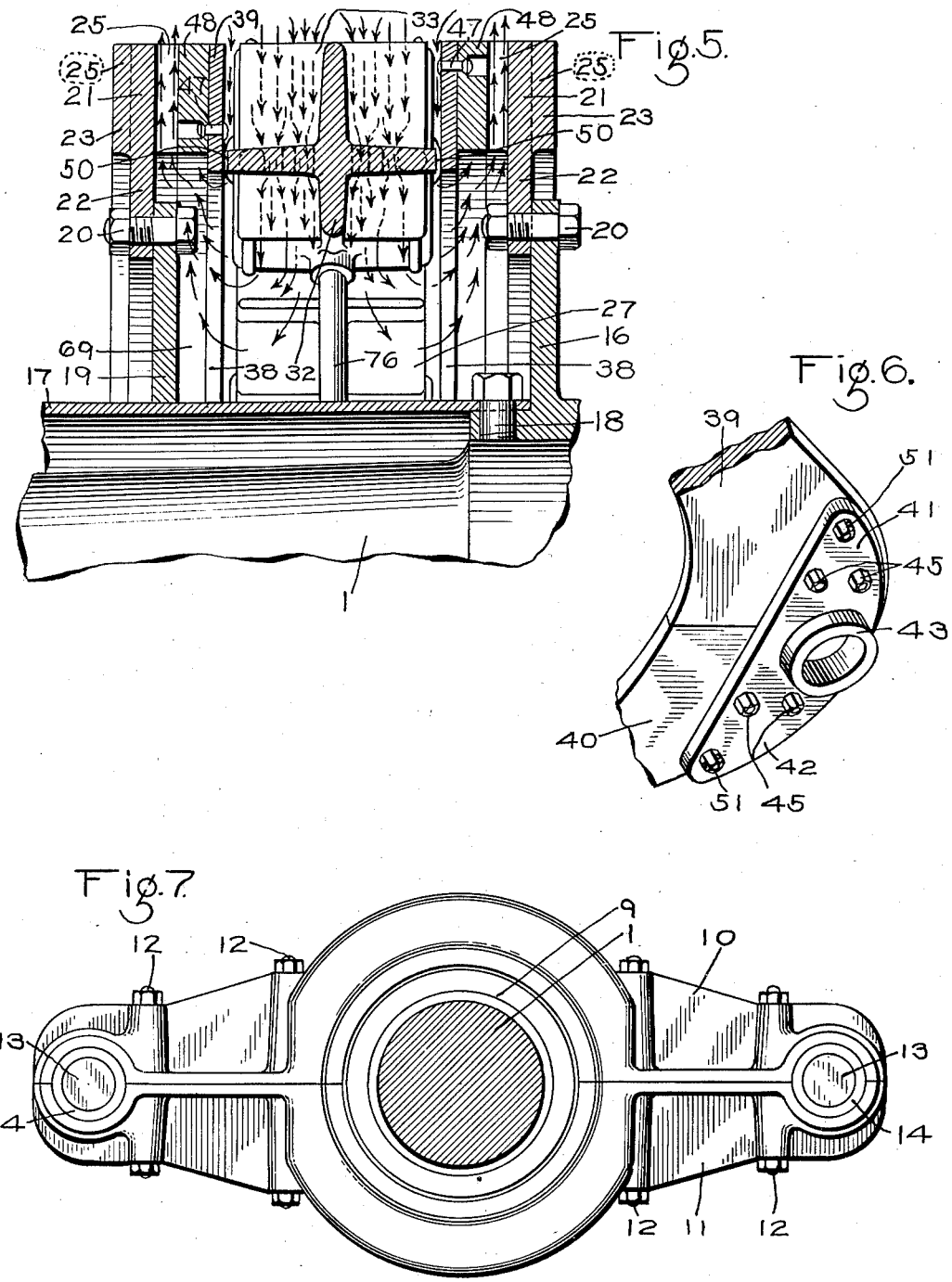

Patented Sept. 26, 1939

2,174,397

UNITED STATES PATENT OFFICE 2,174,397

BRAKE MECHANISM

Clyde C. Farmer, Pittsburgh, and Joseph C. McCune, Edgewood, Pa., assignors to The Westinghouse Air Brake Company, Wilmerding, Pa., a corporation of Pennsylvania Application October 21, 1937, Serial No. 170,240

24 Claims. (Cl. 188—153)

This invention relates to brake mechanisms and more particularly to a friction disk brake mechanism which is of the same general type as that disclosed in a pending application of Joseph C. McCune, Serial No. 139,969, filed April 30, 1937, and which is adapted to be employed in railway vehicles as well as other power driven apparatus when it is desired to check or stop the rotation of revoluble shafts or wheels.

The principal object of the present invention is to provide an improved brake mechanism of the above mentioned type.

Another object of the invention is to provide a brake mechanism of the above mentioned type having improved means for cooling the friction brake elements of the mechanism. According to this object each rotatable brake element is provided with radially arranged grooves which are open at their inner ends to an air chamber located interiorly of the mechanism and which are open at their outer ends to the atmosphere. Due to these grooves the rotatable brake elements, as they are rotated, act as fans to draw air from the interior air chamber and to discharge it to the atmosphere, the air currents thus produced passing over the adjacent faces of both the rotatable and non-rotatable braking elements, thereby dissipating heat generated due to the frictional engagement of the elements to such an extent as to maintain the elements comparatively cool while an application of the brakes is being effected. In practice it has been ascertained that under braking conditions far more severe than those to be expected in train operation this method of cooling served to prevent the temperature of the brake elements from rising to a dangerously high degree.

It is well known that the friction between two relatively movable contacting friction surfaces will be materially reduced by dust which may collect thereon which dust may consist of minute particles worn from the engaging friction surfaces.

Besides serving to force air currents across the faces of the brake elements for cooling, the grooves in the rotatable elements serve another very important purpose namely the maintaining of the friction faces of the brake elements substantially free of the minute particles of metal worn from the elements while the elements are in frictional engagement with each other. According to this feature of the invention dust particles worn from the elements quickly work from between the engaging friction surfaces into the grooves from whence they are thrown outwardly and clear of the mechanism by centrifugal force when the braking element is rotating at high speed. If, however, the speed of the elements is not great enough to thus expel the dust particles such particles will, due to the force of gravity, drop from the grooves free of the mechanism as the elements rotate. It should here be mentioned that when the rotatable brake elements are rotating at a high speed the velocity of the air currents, as they pass through the grooves, will be great enough to materially assist in discharging the dust particles to the exterior of the mechanism.

In this type of brake mechanism the non-rotatable brake elements are adapted to be moved into braking engagement with the rotatable brake elements by means of annular brake cylinder devices which surround the rotatable member to be braked. As shown in the aforementioned pending application Serial No. 139,969 it has been proposed to make each brake cylinder device in two sections and to clamp these sections together at each end. It has also been proposed to provide each of these sections with a single brake cylinder of semi-circular form and to make the pistons which work therein of the same shape. While this form of brake cylinder and piston will produce the desired result it may prove costly to manufacture and fit them together, and in view of this, it is another object of the invention to provide a simplified brake cylinder device which will be cheap to manufacture.

According to this object each section of the casing of the annular brake cylinder device is provided with a plurality of spaced small circular brake cylinders whose axes are parallel with the axis of the rotatable member to be braked, and in which there are mounted correspondingly shaped pistons which are operative by fluid under pressure to actuate the non-rotatable brake elements into braking engagement with the rotatable brake elements. In view of the fact that the cylinders and pistons are of small diameter it will be apparent that these parts may be manufactured and fitted together cheaply.

Another object of the invention is to provide means for conducting the air which is drawn into the interior of the mechanism by the fan like action of the rotatable brake elements so that it will directly contact with the brake cylinder portions of the casings of the brake cylinder devices in order to dissipate as much heat as possible transmitted to these devices through the non-rotatable brake elements to the brake cylinder parts. In practice it has been ascertained that this method of conducting air to the interior of the mechanism insures against the temperature of the brake cylinder devices rising above that which might injure the brake cylinder packings and rubber dust proofing boots which engage the ends of the cylinders and which due to the compactness of the mechanism are in close proximity to the non-rotatable brake elements.

A further object of the invention is to provide a brake mechanism of the above mentioned type having improved means for mounting the non-rotatable brake elements in the mechanism.

Other objects and advantages will be apparent from the following more detailed description of the invention.

In the accompanying drawings Fig. 1 is a plan view illustrating the invention in connection with a wheel and axle assembly of a railway vehicle truck; Fig. 2 is a vertical sectional view of the same taken on the line 2—2 of Fig. 1, certain of the parts of the mechanism being shown broken away to more clearly illustrate other parts thereof; Fig. 3 is an enlarged combined sectional and bottom plan view of a portion of the mechanism taken on the line 3—3 of Fig. 2; Fig. 4 is an enlarged isometric view of a portion of one of the brake elements of the mechanism; Fig. 5 is an enlarged fragmentary sectional view taken on the line 5—5 of Fig. 2 and illustrating by arrows the direction of flow of cooling air currents through the mechanism; Fig. 6 is a fragmentary isometric view of a portion of the mechanism; and Fig. 7 is a sectional view taken on the line 7—7 of Fig. 1.

In the accompanying drawings the brake mechanism has been shown in conjunction with a wheel and axle assembly of a railway vehicle truck, which assembly may comprise an axle 1 having adjacent each end a wheel 2 secured thereto against relative rotation in the usual manner by a pressed fit or by means of a key or both.

Adjacent each wheel, the axle is preferably provided with an enlarged portion on which there is mounted a short sleeve 3 which surrounds the axle and is secured thereto so as to rotate therewith. In the present embodiment of the invention the sleeve is preferably shrunk on the axle, but may be secured thereto in any other desired manner.

Mounted on this sleeve intermediate its ends is an anti-friction bearing 5 of the ball type having an inner ball race member 6, an outer ball race member 7 and ball bearings 8 interposed between and cooperating with the race members in the usual well known manner. The inner race member 6 abuts an annular shoulder provided on the sleeve member and is clamped against the shoulder with such force by a nut 9 having screw threaded connection with the outer end of the sleeve that it will not be permitted to rotate relative to the sleeve.

Carried by the outer race member 7 of each bearing 5 are complementary support members 10 and 11 which are securely clamped to each other and to the outer race member 7 by means of bolts 12. These support members extend at right angles to the axis of the axle 1 and on each side of the axle the ends of the members clamp one end of a bar 13 in place, there being a bushing 14 of a rubber composition interposed between the member and the bar. Each bar extends transversely of the vehicle truck and parallel with the axis of the axle 1.

From the foregoing description it will be understood that there are support members 10 and 11 adjacent each wheel, and that the bars 13 which are arranged one on each side of the axle, connect these sets of support members together.

The sleeve 3 adjacent its inner end is provided with an annular flange 16 which extends radially outwardly from the sleeve at right angles to the axis of the axle 1.

Surrounding the axle 1 and extending longitudinally thereof and at each end telescoping the inner end of the adjacent sleeve 3 is a member 17 which is preferably in the form of a tube, the ends of which are secured to the axle 1 by means of radially arranged stud bolts 18 which extend through accommodating openings in the sleeve and have screw threaded connection with the axle.

Evenly spaced longitudinally of the member 17 and rigidly attached thereto in any desired manner so as to rotate therewith are three annular flanges 19 which are preferably of the same diameter as the flanges 16.

Removably secured to each of the flanges 16 and 19 by means of bolts 20 and extending radially outwardly from the peripheral edge of the flange is an annular brake element 21 which, is preferably made of two segmental pieces which are arranged in end-to-end relation to each other to form an annulus. Each of the segmental pieces is provided with an inner flange portion 22 whereby the piece is secured to the flange 16 or the flange 19, as the case may be, and is also provided with an annular braking portion 23 which is of greater thickness than the securing flange portion 22 and which has each of its side faces divided into a plurality of braking surfaces 24 by radially arranged narrow grooves 25 which extend across the braking portion. The grooves 25 on one side of the braking portion are arranged in staggered relationship to the corresponding grooves on the other side.

Arranged between each two brake elements 21 is an annular brake cylinder device 27 which surrounds the axle 1, there being four of such devices included in the present embodiment of the invention.

Each of these brake cylinder devices may comprise upper and lower semi-circular members 28 and 29, respectively, which at their meeting ends on each side of the axle, are removably clamped together and to the bars 13 by means of bolts 30, there being a gasket 34, preferably made of a rubber composition, interposed between each bar and the brake cylinder members. When thus clamped to the bars 13, the brake cylinder members cannot move longitudinally relative to the bars and since the support members 10 and 11 at each end of the brake mechanism clamp the bars against longitudinal movement the brake cylinder members are at all times maintained against movement in directions longitudinally of the axle.

In the present embodiment of the invention each brake cylinder member comprises four radially arranged circular brake cylinder casings 31 of relatively small diameter which are integrally connected together by members 32 preferably cruciform in cross section as best shown in Fig. 5. These brake cylinder casings are open to both sides of the brake cylinder device and are so arranged that their axes are parallel with the axis of the axle 1. Adjacent each brake cylinder casing and on each side thereof the members 32 are provided with air deflectors 33, each of which is spaced a short distance from the adjacent brake cylinder casing and is curved to substantially conform to the shape of the casing. These deflectors and the outer surfaces of the brake cylinder casings define ducts through which air may flow from the exterior of the mechanism to the interior thereof, the members 32 being provided with openings 35 for permitting such flow past the members.

Arranged between each side of each brake cylinder device 27 and each adjacent rotatable brake element 21 is a non-rotatable brake element 38 which is slidably carried on the bars 13 for movement longitudinally thereof toward and away from the rotatable brake element. Each of these non-rotatable elements may comprise upper and lower vertically aligned flat plates 39 and 40, respectively, which extend transversely of the longitudinal axis of the axle 1 and parallel with the flanges 16 and 19. Each end of each of the upper plates 39 overlaps and is secured to the upwardly extending flange 41 of a support bracket 42 having a portion 43 which encircles and is slideable on one of the bars 13, the lower plate 40 overlapping and being secured to a downwardly extending flange 44 of the bracket. The plates 39 and 40 when thus secured to the brackets 42 surround the axle and for the purpose of facilitating their removal or replacement in making repairs, these plates are removably secured to the flanges of the brackets by means of bolts 45.

Secured to each side of each non-rotatable plate by countersunk rivets 47 or any other desired means is a semi-circular friction plate or brake shoe 48 which has a friction face for engagement with the friction faces 24 of an adjacent rotatable braking element. When the plates 39 and 40 are secured together in the manner just described, the friction plates 48 secured to each side of each of the plates 39 and 40 form an annulus substantially the same inside and outside diameters as the rotatable brake element 21, and in which the friction faces are substantially the same width as the friction faces 24 of the rotatable element.

Extending between and secured by means of bolts to the two non-rotatable brake elements which are arranged one on each side of each brake cylinder device are release springs 49 which normally maintain such brake elements in their release position in which position these brake elements engage stops 50 which are formed by the ends of the lateral flanges of the members 23 of the brake cylinder devices. In the present embodiment of the invention there are four of these release springs which are arranged two at each side of the mechanism. At each side of the mechanism the two springs are arranged one above and one below the adjacent bar 13 and each end of each spring is anchored to the head of a bolt 51 carried by the bracket member 42.

Contained in each brake cylinder casing are two circular pistons 56 and 57 which are disposed face to face and which as will hereinafter more fully appear are movable in opposite directions to each other in effecting either an application or the release of the brakes.

Each piston 56 is provided with a head having an outwardly extending annular guide flange 58 and is also provided with a centrally arranged piston stem 59 on which there is removably mounted a wear piece 60 made of any desired wear resisting metal.

Adjacent the juncture of the piston stem and the piston head, each piston 56 is provided with an annular groove in which the inner beaded end of a boot 61 is adapted to be snapped, the outer end of the boot having a beaded edge which is snapped into an accommodating annular groove provided in the outer surface of the brake cylinder casing. Extending inwardly from the piston head and preferably integral therewith is a short sleeve 63 which extends through the central opening of an annular piston packing 64 which is clamped to the head by means of an annular ring 65 which has screw threaded connection with the end of the sleeve, there being a thin metal plate 93 interposed between the ring of the packing for preventing the ring from damaging the packing when the ring is rotated to its clamping position. The periphery of the packing is in the form of an annular skirt 66 which extends in a direction opposite to that of the guide flange and which slidably engages the interior surface of the cylinder casing.

The piston stem 59 is provided with a central bore 67 within which one end portion of a guide pin 68 has a press fit with the stem. The other end portion of this pin extends through and beyond the sleeve 63 for slidable engagement with the piston 57 as will hereinafter more fully appear.

Each piston 57 is in many respects quite similar to the piston 56 in that it has a head which is provided with an outwardly extending annular guide flange 58, a piston stem 59, a wear piece carried by the end of the stem, piston packing having a peripheral skirt 66 which extends in a direction toward the skirt of the packing of the piston 56, an annular ring 65 which has screw threaded connection with a portion of the piston for clamping the packing to the piston head, a metal plate interposed between the ring and packing and a boot 61. This piston differs from piston 56 in that it is provided with an extension 70 which extends into the sleeve 63 of the piston 56, the end of which extension is adapted to engage the piston 56 as shown in Fig. 3 to limit the releasing movement of the piston so that when the pistons are in their release position there will be clear space between the major portions of their pressure faces. The extension 70, piston head and piston stem are provided with a central bore 72 for the reception of the major portion of the pin 68, the diameter of the bore being slightly greater than that of the pin to provide a free sliding fit between the pin and piston. It will be apparent that in this piston arrangement, the pistons will cooperate with each other through the medium of the pin in such a manner as to counteract any tendency of one piston to cock relative to the other, thus assisting in insuring the proper operation of the piston.

The space between the pressure faces of the pistons of each annular brake cylinder device is connected through a passage 75 to a pipe 76 arranged interiorly of the mechanism, the passage 75 being of considerably less diameter than the pipe 76. The pipe 76 is connected by way of a passage 77 in the brake cylinder member to an exterior application and release conduit 90 which leads from any desired brake controlling valve mechanism, not shown, but which may function to supply fluid under pressure to the conduit to effect an application of the brakes and to vent fluid under pressure therefrom to effect a release of the brakes.

Since the flow area of each brake cylinder passage 75 is less than that of the pipe 76, there will be a substantially uniform rate of build up of brake cylinder pressure in each brake cylinder when an application of the brakes is being effected and a substantially uniform rate of reduction in the pressure of each brake cylinder when the release of the brakes is being effected, that is to say, the brake cylinder passages 75 so control the flow of fluid to or from the brake cylinders of each brake cylinder device that one brake cylinder will not operate in advance of the other. By reason of this the brake cylinder piston will at no time have a tendency to move the non-rotatable braking elements from their parallel relationship to the rotatable brake elements, thus insuring against the occurrence of any binding action between the brackets and the bars 13.

The brake cylinder devices 27, brake elements 38, and members 10 and 11 and bars 13 are maintained against rotation on the axle by any suitable connection to the truck frame. In the present embodiment of the invention this connection consists of an upwardly extending lug 91 on the upper half of each brake cylinder device and an inverted channel 92 which extends transversely of the truck and which engages the lugs 91 to prevent rotation of the above mentioned parts.

It will be seen from Fig. 3 of the drawings that the inside diameters of the brake cylinder devices and the non-rotatable elements are each greater than that of the tube and due to this, adjacent rotatable brake elements, the non-rotatable brake elements, the brake cylinder device located between the non-rotatable brake elements, and the tube define an air chamber 69 on the interior of the mechanism, which chamber is in comunication with the atmosphere by way of the spaces between the non-rotatable brake elements and the brake cylinder device, also by way of the ducts defined by the deflectors and the outer surfaces of the brake cylinder casings and further by way of the grooves 23 in the rotatable brake element, the grooves 25 forming air ex- exhaust communications from the chamber to the atmosphere.

Assuming the several parts of the brake mechanism to be in release position as shown in Fig. 1 and it is desired to effect an application of the brakes, fluid under pressure is supplied by any suitable means to the conduits 90 and from thence flows through passages 77, pipes 76 arranged interiorly of the mechanism and passages 75, of small diameter, to the faces between the pistons 56 and 57, causing the pistons of each brake cylinder to move outwardly in opposite directions to each other. The pistons as they are thus moved force the non-rotatable brake elements into braking engagement with the rotatable brake elements to provide the desired braking effect.

Each rotatable brake element due to the grooves 25 in its friction faces acts, when the element is rotating, as a fan to draw air from the chamber and pass it across both the rotatable and non-rotatable brake elements to the atmosphere, the air as it flows through the grooves 25 contacting the friction face of the non-rotating elements and contacting the bottom and side walls of the grooves. As the air is thus drawn from the chamber, air from the exterior of the mechanism flows to the chamber by way of the spaces between the non-rotatable brake elements and the brake cylinder devices, the air current contacting the rear surfaces of these elements and the sides of the brake cylinder device, the boot 61 and the brake cylinder piston stem. Air passing through the grooves 25 will dissipate considerable heat produced in the plates by friction and the air passing between the brake cylinder device and the non-rotatable elements will assist in dissipating heat from the elements and heat which may be transmitted from the non-rotatable elements to the piston stems. Air passing between the deflectors and the brake cylinder casings on its way to the chamber serves to effectively dissipate heat from the brake cylinder device. It will here be understood that the current of air passing between the non-rotatable brake element and the adjacent side of the adjacent brake cylinder device will effectively carry away heat radiated from the element, thus guarding the rubber composition boots 61 against damage due to heat. From the foregoing it will be seen that the rotatable and non-rotatable brake elements will be maintained comparatively cool and that heat which may be transmitted to the brake cylinder devices will be so dissipated that the temperatures in these devices will not, under more severe braking conditions than is to be expected in actual service, be increased to such a degree as to cause damage to the several working parts of the devices.

While the friction faces of the non-rotatable and rotatable brake elements are in frictional engagement with each other, minute particles of metal worn away from the friction surfaces, due to such engagement, will work their way from between these surfaces and be deposited into the grooves 25 of the rotatable brake element and will be discharged therefrom by either centrifugal force or by the force of the air currents passing through the grooves. If the rotary speed of the rotatable brake element is too low to discharge the particles in this manner they will be discharged by the force of gravity as the grooves move across the top or bottom of the mechanism the particles thus discharged from the grooves 25 at the top of the mechanism, fall through the chamber 69 and through the grooves 25 at the bottom of the mechanism to the exterior of the mechanism. From this it will be seen that during a brake application, the friction faces of both the rotatable and non-rotatable brake elements are maintained substantially free of minute particles of metal worn from these faces, thus the friction characteristics of the brake elements are maintained substantially constant or uniform.

When it is desired to effect the release of the brakes fluid under pressure is vented from the piston chamber or space between the pressure faces of the pistons 56 and 57 and as this is done the release springs act to move the non-rotatable brake elements toward each other and out of braking engagement with the rotatable brake elements, the non-rotatable elements being brought to a stop in their normal release position by the stops 50. The non-rotatable brake elements as they are thus moved force the pistons 56 and 57 to their normal release positions as shown in Fig. 3.

While one illustrative embodiment of our invention has been described in detail, it is not our intention to limit its scope to this embodiment or otherwise than by the terms of the appended claims.

Having now described our invention, what we claim as new and desire to secure by Letters Patent, is:

1. In a brake mechanism, in combination, a rotatable member to be braked, a rotatable brake element driven by said rotatable member, a non-rotatable brake element movable into frictional braking engagement with the rotatable brake element, operating means for moving said non-rotatable brake element into braking engagement with the rotatable brake element, said brake elements and means defining an air chamber on the interior of the mechanism, means operative when the rotatable member is rotating for drawing air from said chamber and passing it across said brake elements for dissipating heat from said elements, said non-rotatable brake element, and said means defining an air duct through which air is admitted to said chamber, an air inlet in said means through which air is also admitted to said chamber, and means comprising a deflector for causing the air entering said chamber through said inlet to follow the contour of a certain portion of said operating means to dissipate heat therefrom.

2. In a brake mechanism, in combination, a rotatable member to be braked, a rotatable brake element driven by said rotatable member, a non-rotatable brake element movable into frictional braking engagement with the rotatable brake element, means operative by fluid under pressure for moving said non-rotatable brake element into braking engagement with said rotatable brake element, said elements and means defining an air chamber on the interior of the mechanism which is open to the atmosphere past said non-rotatable element and means, and which is also open to the atmosphere through ducts formed in said means, and means operative when the rotatable member is rotating for causing air to flow from the atmosphere past said non-rotatable element and through said ducts to said chamber and from thence across the brake elements for dissipating heat from said elements and fluid pressure operative means.

3. In a brake mechanism, in combination, a rotatable member to be braked, two spaced rotatable brake elements adapted to be driven by said member, two non-rotatable brake elements arranged one adjacent each rotatable brake element and each being movable into frictional braking engagement with the adjacent rotatable brake element, fluid pressure operative means disposed between said non-rotatable brake elements for moving the non-rotatable brake elements into braking engagement with the rotatable brake elements, and means included in the rotatable brake elements operative when the rotatable elements are rotating for causing air to flow from the atmosphere past said non-rotatable brake elements and fluid pressure operative means to the interior of the mechanism and from thence across said elements to the atmosphere for dissipating heat from the mechanism.

4. In a brake mechanism, in combination, a rotatable member to be braked, a brake element carried by said member and rotatable thereby, a non-rotatable supporting structure carried by said member, a non-rotatable brake element encircling said member and movable into frictional braking engagement with said rotatable brake element, brackets slidably mounted on said structure at opposite sides of said member supporting said non-rotatable elements, and means carried by said supporting structure operative to move said non-rotatable element into braking engagement with said rotatable elements.

5. In a brake mechanism, in combination, a rotatable member to be braked, a brake element carried by said member and rotatable thereby, a non-rotatable supporting structure carried by said member, said supporting structure comprising support members arranged one on each of opposite sides of the member and extending parallel therewith, and means mounted on said member carrying said support members, a non-rotatable brake element encircling said member and slidably carried by said support members for movement into braking engagement with the rotatable brake element, and means secured to said structure operative to move the non-rotatable element into braking engagement with the rotatable element.

6. In a brake mechanism, in combination, a rotatable member to be braked, a brake element carried by said member and rotatable thereby, a non-rotatable supporting structure carried by said member, an anti-friction bearing interposed between the member and supporting structure for permitting rotation of the member relative to the structure, a non-rotatable brake element movable into frictional braking engagement with said rotatable brake element, brackets slidably mounted on said structure at opposite sides of said member supporting said non-rotatable element, and means rigidly carried by said structure operative to move said non-rotatable element into braking engagement with said rotatable element.

7. A brake cylinder unit comprising an arcuate casing which is adapted to be secured to a corresponding casing to form an annulus and having a plurality of spaced radially arranged fluid pressure responsive brake cylinders whose axes are parallel to the axis of the unit and also having conduits for admitting fluid under pressure to each brake cylinder, the conduit of each arcuate casing being separate from the corresponding conduit of the other arcuate casing.

8. A brake cylinder device comprising a plurality of spaced circular brake cylinders arranged in the arc of a circle, members connecting the brake cylinders together as a unit, and means associated with said members adapted to direct air currents against said brake cylinders for dissipating heat therefrom.

9. A brake cylinder unit comprising a plurality of spaced brake cylinders arranged in the arc of a circle, members rigidly connecting the brake cylinders together, means associated with said members adapted to direct air currents against said brake cylinders for dissipating heat therefrom, said members having openings formed therein adapted to permit air currents directed by said means to flow through the members.

10. A brake cylinder device comprising an annular casing having a plurality of spaced radially arranged circular fluid pressure responsive brake cylinders whose axes are parallel to the axis of the device, a conduit through which fluid under pressure is adapted to be supplied for operating said brake cylinders, and a flow restricting passage leading from said conduit to each of said brake cylinders.

11. In a brake mechanism, in combination, a rotatable member to be braked, a brake element rotatable by said member and having a braking face on each side, two non-rotatable annular brake cylinder devices encircling said member and arranged one on each side of the rotatable brake element, each brake cylinder device comprising a plurality of spaced radially arranged small circular brake cylinders, two annular non-rotatable brake elements arranged one between each brake cylinder device and the adjacent braking face of the rotatable brake element, and operative by said brake cylinders into frictional braking engagement with the rotatable brake element, and means operative when said member is rotating for causing air to flow across all of said braking elements.

12. In a brake mechanism in combination, a rotatable member to be braked, a brake element rotatable by said member and having a braking face on each side, two non-rotatable annular brake cylinder devices encircling said member and arranged one on each side of the rotatable brake element, each brake cylinder device comprising a plurality of spaced radially arranged small circular brake cylinders, two annular non-rotatable brake elements arranged one between each brake cylinder device and the adjacent braking face of the rotatable brake element, and operative by said brake cylinder into frictional braking engagement with the non-rotatable brake element, and means included in the rotatable brake element for causing air to flow across all of said braking elements when the rotatable element is in operation.

13. In a brake mechanism, in combination, a rotatable member to be braked, a brake element rotatable by said member and having a braking face on each side, two non-rotatable annular brake cylinder devices encircling said member and arranged one on each side of the rotatable brake element, two annular non-rotatable brake elements arranged one between each brake cylinder device and the adjacent braking face of the rotatable brake element and operative by said brake cylinder devices into frictional braking engagement with the rotatable brake element, and means associated with said rotatable element adapted to create air currents and to cause them to flow across all of the brake elements when the rotatable element is rotating.

14. In a brake mechanism, in combination, a rotatable member to be braked, a brake element rotatable by said member and having a braking face on each side, two non-rotatable annular brake cylinder devices encircling said member and arranged one on each side of the rotatable brake element, each brake cylinder device comprising a plurality of spaced radially arranged small circular brake cylinders, two annular non-rotatable brake elements arranged one between each brake cylinder device and the adjacent braking face of the rotatable brake element, and operative by said brake cylinders into frictional braking engagement with the rotatable brake element, and means operative when said member is rotating for causing air to flow across all of said braking elements and through both of said brake cylinder devices.

15. In a brake mechanism, in combination, a rotatable member to be braked, a brake element rotatable by said member and having a braking face on each side, two non-rotatable annular brake cylinder devices encircling said member and arranged one on each side of the rotatable brake element, each brake cylinder device comprising a plurality of spaced radially arranged small circular brake cylinders, two annular non-rotatable brake elements arranged one between each brake cylinder device and the adjacent braking face of the rotatable brake element, and operative by said brake cylinders into frictional braking engagement with the rotatable brake element, and means operative when said member is rotating for causing air to flow across all of said braking elements and through the brake cylinder devices and also across the ends thereof.

16. In a brake mechanism, in combination, a rotatable member to be braked, two spaced brake elements rotatable by said member, an annular non-rotatable brake cylinder device encircling said member and located between said two rotatable brake elements, two annular non-rotatable brake elements encircling said member and arranged one between the brake cylinder device and each rotatable brake element, said non-rotatable elements being movable in opposite directions by said brake cylinder device into frictional braking engagement with the rotatable brake elements, and means for causing air to flow across all of said brake elements while said member is rotating.

17. In a brake mechanism, in combination, a rotatable member to be braked, two spaced brake elements rotatable by said member, an annular non-rotatable brake cylinder device encircling said member and located between said two rotatable brake elements, two annular non-rotatable brake elements encircling said member and arranged one between the brake cylinder device and each rotatable brake element, said non-rotatable elements being movable in opposite directions by said brake cylinder device into frictional braking engagement with the rotatable brake elements, and means for causing air to circulate about said elements and brake cylinder device while said member is rotating.

18. In a brake mechanism in combination, a rotatable member to be braked, two spaced brake elements rotatable by said member, an annular non-rotatable brake cylinder device encircling said member and located between said rotatable brake elements, two annular non-rotatable brake elements encircling said member and arranged one between said brake cylinder device and each rotatable brake element, said non-rotatable elements being movable in opposite directions by said brake cylinder device into frictional braking engagement with the rotatable brake elements, and means for causing air to circulate about said elements and brake cylinder device while said member is rotating, the circulation of air being from the atmosphere past the brake cylinder device and back of the non-rotatable brake element to the interior of the mechanism and from thence across the braking faces of all of the brake elements to the atmosphere.

19. In a brake mechanism, in combination, a rotatable member to be braked, a rotatable brake element driven by said rotatable member, a non-rotatable brake element for frictional braking engagement with said rotatable brake element, a casing, means carried by said casing and operative to effect the frictional braking engagement of said brake elements to brake said member, said casing and elements cooperating to define an air chamber on the interior of the mechanism and said casing having an air inlet from the atmosphere to the chamber, and means operative when the rotatable member is rotating for drawing air from said chamber and passing it across said elements for dissipating heat from the elements.

20. In a brake mechanism, in combination, a rotatable member to be braked, a rotatable brake element driven by said rotatable member, a non-rotatable brake element for frictional braking engagement with said rotatable brake element, a casing, means carried by said casing and operative to effect the frictional braking engagement of said brake elements to brake said member, said casing and elements cooperating to define an air chamber on the interior of the mechanism and said casing having an air inlet from the atmosphere to the chamber, means operative when the rotatable member is rotating for drawing air from said chamber and passing it across said elements for dissipating heat from the elements, and means adjacent said inlet for directing the flow of air to the chamber.

21. In a brake mechanism, in combination, a rotatable member to be braked, a rotatable brake element driven by said rotatable member, a non-rotatable brake element for frictional braking engagement with said rotatable brake element, a casing, means carried by said casing and operative to effect the frictional braking engagement of said brake elements to brake said member, said casing and elements cooperating to define an air chamber on the interior of the mechanism and said casing having an air inlet from the atmosphere to the chamber, means operative when the rotatable member is rotating for drawing air from said chamber and passing it across said elements for dissipating heat from the elements, and air directing fins carried by said means for directing the flow of air to said chamber.

22. In a brake mechanism, in combination, a rotatable member to be braked, a rotatable brake element driven by said rotatable member, a non-rotatable brake element for frictional braking engagement with said rotatable brake element, a casing, means carried by said casing and operative to effect the frictional braking engagement of said brake elements to brake said member, said casing and elements cooperating to define an air chamber on the interior of the mechanism and said casing having an air inlet from the atmosphere to the chamber, means operative when the rotatable member is rotating for drawing air from said chamber and passing it across said elements for dissipating heat from the elements, and air directing fins carried by said means interiorly and exteriorly of the mechanism for directing the flow of air to said inlet and from said inlet to the chamber.

23. In a disk brake mechanism for a wheel of a railway vehicle truck, in combination, a rigid structure secured for rotation with said wheel, annular rotatable and non-rotatable friction brake elements adapted to frictionally interengage to brake said wheel, said rotatable brake element being secured to said structure for rotation with the wheel in concentric relation therewith, a non-rotatable supporting structure journaled on said rigid structure, said non-rotatable element comprising arcuate sections disposed in end to end relation to form an annulus, and a bracket overlapping and securing each pair of adjacent ends of the sections together and slidably mounted on said supporting structure for movably supporting the non-rotatable element.

24. In a disk brake mechanism for a wheel of a railway vehicle truck, in combination, a rigid structure secured for rotation with said wheel, annular rotatable and non-rotatable friction brake elements adapted to frictionally interengage to brake said wheel, said rotatable brake element being secured to said structure for rotation with the wheel in concentric relation therewith, a non-rotatable supporting structure journaled on said rigid structure, said non-rotatable brake element being carried by said supporting structure, and an annular brake cylinder device for controlling the braking operation of said elements, said brake cylinder device comprising arcuate sections disposed in end to end relation and secured to said supporting structure, each section comprising a plurality of spaced radially arranged brake cylinders and a conduit connecting the brake cylinders of each section, the conduit of one section being independent of the corresponding conduit of the other section whereby each of the sections is rendered operative independently of the other.

CLYDE C. FARMER.
JOSEPH C. McCUNE.